Jan. 14, 1964 D. N. MICHNOFF 3,117,613
TRACTION INCREASING DEVICE FOR RESILIENT TIRES
Filed Aug. 2, 1962

INVENTOR
DAVID N. MICHNOFF
Attorney

__United States Patent Office__

3,117,613
Patented Jan. 14, 1964

3,117,613
TRACTION INCREASING DEVICE FOR RESILIENT TIRES
David N. Michnoff, 3328 Chauncey Place, Mount Rainier, Md.
Filed Aug. 2, 1962, Ser. No. 214,416
10 Claims. (Cl. 152—228)

The present invention relates to a traction increasing device and more particularly to a traction increasing attachment which may be removably secured to a resilient tire of a vehicle wheel.

It is a main object of this invention to provide a novel and improved traction attachment for a resilient tire, particularly for automobiles, this attachment being of simple construction, inexpensive to manufacture and effective in its operation. It is easily attached to a resilient tire and similarly it may be removed from such tire without difficulty.

It is another object of this invention to provide a tire attachment of the above-described type which will furnish improved gripping power at the point and time of greatest peripheral strain.

It is still another object of this invention to provide a device which will grip a resilient tire without serious damage to the material of the tire surface.

Further objects and advantages of this invention will become apparent from the following description taken in combination with the accompanying drawings in which.

Figure 1:
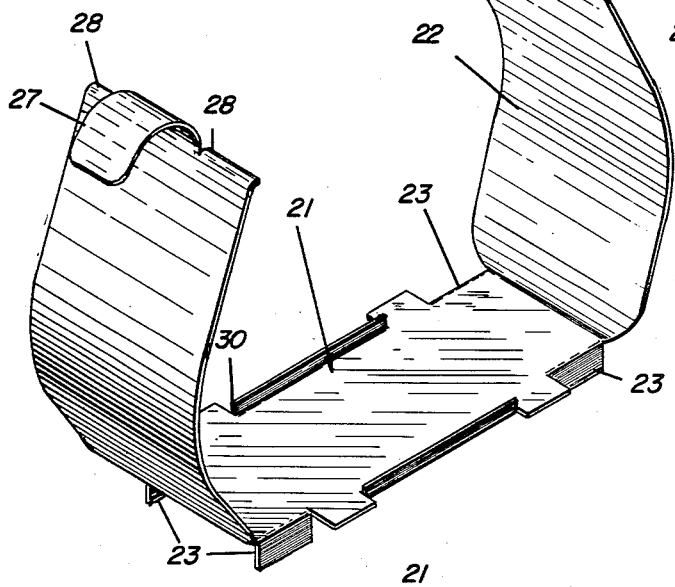
FIG. 1 is a perspective view of a traction increasing device according to this invention.
Figure 3:
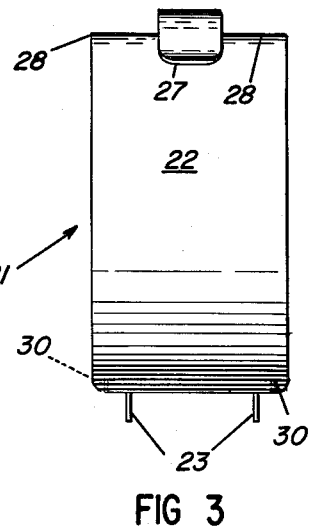
FIG. 3 is a side elevation of the traction increasing device of the invention.
Figure 2:
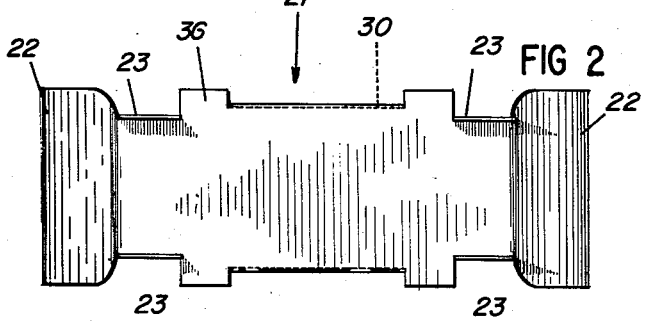
FIG. 2 is a plan view of the base portion of the traction device shown in FIG. 1.

Referring now particularly to the drawings, the traction increasing device of the present invention is indicated generally at 21 and represents a substantially U-shaped member made of a resilient metal or plastic. Turned down from this resilient member, which may suitably be in the form of a band, are paired traction cleats 23 which serve as gripping edges providing superior road surface gripping action by reason of their higher per unit area loading capacity and the ability of the harder material to dig into ice, snow or mud.

The lower end of each side leg 22 of device 21 has a degree of curvature with respect to a tire to which the device is to be attached that when the weight of the tire bears down on the transverse portion of the device, the lower end of the side leg will not be in contact with the expanded side walls of the tire, and thus will not push the side legs away from the tire.

The center portion at the end of each side leg is bent outwardly to form a hook 27 which may serve to connect a strap, cable, spring or other fastening means around the tire and wheel assembly in order to fasten the device more securely to the wheel. The side portions 28 on either side of hook 27 are bent inwardly to form gripping edges which may be separated if desired and aid in maintaining the device in position on the tire. The hooks 27 of the side legs are provided either with a tightly fitting rubber tubing or sleeve, or a coating of a rubber or other resinous material which has the dual purpose of preventing a wearing of a strap or rope tied to these hook portions at the edges of the hooks, as well as providing a more convenient gripping surface for handling the tire attachment during cold weather, putting it on or off, and to give the gripping edges more traction on the side of the tire.

The transverse web or tread portion of the U-shaped member connecting the two side legs is provided with interior or upwardly turned ridges which are preferably struck up from the edges of the center portion of the web so as to provide special tire tread gripping edges which prevent circumferential slipping of the U-shaped member relative to a tire on which it is mounted. The aforementioned cleats are similarly integral with the web or base portion of the U-shaped member and are struck downwardly from the edges of the web portion on each side thereof to thus provide two opposite cleats at each end of the web portion. These cleats raise the web portion of the U-shaped member and extend downwardly from the plane of the straight web portion of the member. It will thus be observed that the cleats have the dual purpose of providing the gripping action of the traction increasing device, thus its traction, and also the bridging effect which causes the side legs of the device to move inwardly against the side walls of the tire on which the device is secured when the bridge or web portion is depressed. Similarly, the aforementioned ridges have the dual purpose of providing a traction effect on the tread of the tire against which it is urged, and of increasing the effective height of the bridge and thus the pressure exerted by the side legs of the device against the side walls of the tire. Upon the application of a force or weight such as the weight of a tire and vehicle on the ridges 30 at the center of the web portion the latter will deflect or bend downwardly and urge the side legs of the device to move toward each other and thereby enhance the gripping pressure of the device against the side walls of a tire on which the device is mounted.

Figure 4:
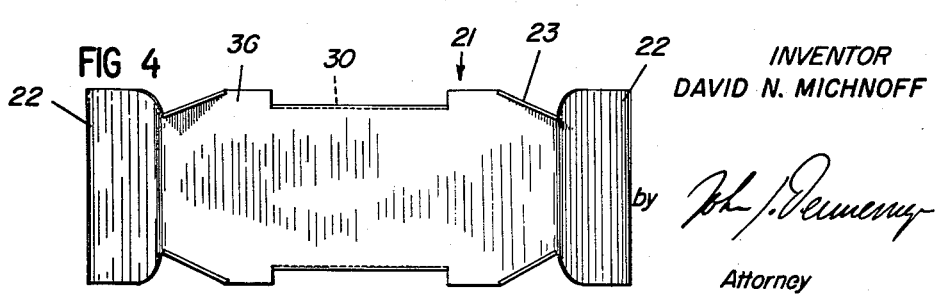
FIG. 4 is a plan view of the base portion of the traction increasing device showing a modified form of the traction cleats.

The form of the cleats is susceptible of modifications, for example, such that they could be cut and turned down from the transverse portion of the band as a triangular instead of a rectangular portion, as specifically illustrated in FIG. 4 of the drawing. The forming of the ridges and cleats or bending of the edges of the web portion of the U-shaped member into a generally channel-like cross-section also greatly increases the strength-to-weight ratio of such a member.

While the preferred embodiments and applications of the invention have been described, it will be understood that the invention is not limited thereto, but may be variously modified and practiced within the scope of the appended claims.

What is claimed is:

1. A traction increasing device for removable attachment to a resilient tire of a wheel comprising a substantially U-shaped resilient member adapted to fit over a resilient tire, said member having side legs and a substantially flat transverse web portion designed to fit over and engage respectively the side and tread portion of a tire, said transverse web portion having downwardly extending projections at each end and upwardly extending intermediate projections disposed between said downwardly extending projections.

2. A traction increasing device for removable attachment to a resilient tire of a wheel comprising a substantially U-shaped resilient band adapted to fit over a resilient tire, said band having side legs and a substantially flat transverse web portion designed to fit over and engage respectively the sides and tread of a tire, said transverse web portion having integral projections turned downwardly from an edge portion at each end of said transverse web portion, and integral projections turned upwardly from a central edge portion of said transverse web portion.

3. A traction increasing device for removable attachment to a resilient tire of a wheel comprising a substantially U-shaped resilient member adapted to fit over a resilient tire, said member having side legs and a substantially flat transverse web portion disposed to fit over and engage respectively the sides and tread of a tire, said transverse web portion having a pair of downwardly extending cleats struck from opposite edges at each end of said transverse web portion, and a pair of upwardly extending ridges struck from opposite edges of said transverse web portion intermediate said pairs of downwardly extending cleats.

4. A traction increasing device according to claim 3 wherein said upwardly extending intermediate ridges are spaced from said downwardly extending cleats located at each end of said transverse web portion.

5. A traction increasing device according to claim 3 wherein said downwardly extending cleats and said upwardly extending ridges lie substantially parallel to the plane of said U-shaped member, said downwardly extending cleats coacting with said upwardly extending ridges under opposing loads to urge said side legs of said member toward each other.

6. A traction increasing device according to claim 3 wherein said downwardly extending cleats have a rectangular configuration.

7. A traction increasing device according to claim 3 wherein said downwardly extending cleats have a triangular configuration.

8. A traction increasing device according to claim 3 wherein said side legs have a central outwardly turned end portion.

9. A traction increasing device according to claim 3 wherein said side legs have lateral inwardly turned end portions for engaging said tire and gripping it therebetween.

10. A traction increasing device according to claim 3 where said side legs are bent outwardly adjacent said transverse web portion to define a space between the tire and said side legs for receiving the transverse flexure of said tire under load.

References Cited in the file of this patent
UNITED STATES PATENTS

| | | |
|---|---|---|
| 1,329,200 | Newhope | Jan. 27, 1920 |
| 1,800,202 | Arno | Apr. 14, 1931 |
| 2,625,194 | Westrate | Jan. 13, 1953 |
| 2,722,260 | Renwick | Nov. 1, 1955 |
| 2,953,182 | Brown | Sept. 20, 1960 |